United States Patent
Nakamura

(10) Patent No.: US 8,172,029 B2
(45) Date of Patent: May 8, 2012

(54) SADDLE-RIDING TYPE VEHICLE

(75) Inventor: Kenta Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 12/633,540

(22) Filed: Dec. 8, 2009

(65) Prior Publication Data

US 2010/0163331 A1    Jul. 1, 2010

(30) Foreign Application Priority Data

Dec. 26, 2008   (JP) ................. 2008-332521

(51) Int. Cl.
  *B60K 26/00*  (2006.01)
  *B62D 21/00*  (2006.01)
  *B62D 61/02*  (2006.01)
  *B62K 11/00*  (2006.01)

(52) U.S. Cl. ......... 180/315; 180/311; 180/312; 180/219

(58) Field of Classification Search .................. 180/311, 180/312, 315, 219; 123/195 R
See application file for complete search history.

(56) References Cited

U.S. PATENT DOCUMENTS

| | | | | |
|---|---|---|---|---|
| 4,134,370 A * | 1/1979 | Iwahashi et al. | ........... | 123/41.31 |
| 5,515,703 A * | 5/1996 | Chance | ........... | 70/176 |
| 5,908,079 A * | 6/1999 | Amino | ........... | 180/219 |
| 6,234,265 B1 * | 5/2001 | Wollmer | ........... | 180/219 |
| 6,779,620 B2 * | 8/2004 | Taniguchi et al. | ........... | 180/219 |
| 6,948,472 B2 * | 9/2005 | Suzuki et al. | ........... | 123/198 D |
| 7,931,109 B2 * | 4/2011 | Murasawa et al. | ........... | 180/219 |
| 2006/0273608 A1 * | 12/2006 | Shinsho | ........... | 296/37.1 |

FOREIGN PATENT DOCUMENTS

| | | |
|---|---|---|
| JP | 3497214 B2 | 11/2003 |
| JP | 4131787 B2 | 2/2008 |

* cited by examiner

*Primary Examiner* — Paul N. Dickson
*Assistant Examiner* — Joselynn Y Sliteris
(74) *Attorney, Agent, or Firm* — Birch, Stewart, Kolasch & Birch, LLP

(57) ABSTRACT

A saddle-riding vehicle mounted with a V engine between a front wheel and a rear wheel, the V engine having a front cylinder portion extending obliquely forwardly and upwardly from a crankcase and a rear cylinder portion extending obliquely rearwardly and upwardly from the crankcase. A main switch is disposed between the front cylinder portion and the rear cylinder portion, and also an intake system is disposed between the front cylinder potion and the rear cylinder portion, wherein the main switch is fixed to the intake system. The main switch is disposed efficiently in terms of space utilization.

20 Claims, 6 Drawing Sheets

SADDLE-RIDING TYPE VEHICLE

CROSS-REFERENCE TO RELATED APPLICATIONS

The present application claims priority under 35 USC 119 to Japanese Patent Application No. 2008-332521 filed on Dec. 26, 2008 the entire contents of which are hereby incorporated by reference.

BACKGROUND OF THE INVENTION

1. Field of the Invention

The present invention relates to an improved saddle-riding type vehicle.

2. Description of Background Art

A saddle-riding type vehicles is known that includes an ignition switch mounted on a vehicle body frame via a stay. See, for example, Japanese Patent No. 3497214. In addition, an ignition switch mounted on an engine hanger is known that is mounted on a vehicle body frame for supporting an engine. See, for example, Japanese Patent No. 4131787.

In accordance with FIGS. 3 to 5 of Japanese Patent No. 3497214, a pair of left and right seat rails 2 is mounted at a rear portion of a main pipe 1 that forms part of a vehicle body frame. A stay 8 is mounted near a connection of the main pipe 1 to the seat rails 2. An ignition switch 11 is attached to the stay 8. A fuel tank T is disposed upwardly of the ignition switch 11 so as to straddle the main pipe 1.

In accordance with FIG. 13 of Japanese Patent No. 4131787, an engine hanger 220 is mounted via a bracket 45 on a cross pipe 30 that forms part of a vehicle body frame and extends in a vehicle width direction. An engine 9 is mounted on the engine hanger 220. An ignition switch 223 is mounted upwardly of a portion of the engine hanger 220 on which the engine 9 is mounted.

In the arrangement disclosed in Japanese Patent No. 3497214, a weld nut 7 is welded to a side portion of the main pipe 1 and the stay 8 is attached to the weld nut 7 using a bolt 9. Accordingly, the bolt 9 is adapted to protrude a small amount so as not to interfere with the fuel tank T that is disposed so as to cover a circumference of the main pipe 1.

A mounting structure for mounting the ignition switch 11 has the following arrangements. More specifically, the main pipe 1 includes a hole drilled in the side portion thereof. Part of the weld nut 7 is inserted in this hole so that the weld nut 7 has a thin-wall portion that protrudes from the main pipe 1, which suppresses the amount of protrusion of the bolt 9. Restrictions are as such imposed on the main pipe 1 in order to mount the ignition switch 11.

In the arrangement disclosed in Japanese Patent No. 4131787, the engine hanger 220 includes an engine mounting portion for mounting the engine 9 thereon. The engine mounting portion includes a protrusion formed upwardly thereof. The protrusion protrudes upwardly for mounting the ignition switch 223. This results in a complicatedly shaped engine hanger 220. As such, in the arrangement of Japanese Patent No. 4131787, restrictions are imposed on the engine hanger 220 which is one part on the side of the vehicle body frame, as in the arrangement of Japanese Patent No. 3497214.

SUMMARY AND OBJECTS OF THE INVENTION

It is an object of an embodiment of the present invention to provide a saddle-riding type vehicle that can improve the degree of freedom in design on the vehicle body side.

In accordance with an embodiment of the present invention, there is provided a saddle-riding type vehicle mounted with a V engine between a front wheel and a rear wheel, the V engine having a front cylinder portion extending obliquely forwardly and upwardly from a crankcase and a rear cylinder portion extending obliquely rearwardly and upwardly from the crankcase. This saddle-riding type vehicle includes, a main switch disposed between the front cylinder portion and the rear cylinder portion; and an intake system disposed between the front cylinder portion and the rear cylinder portion and the main switch is fixed to the intake system.

According to an embodiment of the present invention, the main switch is disposed by using a space disposed between the front cylinder portion and the rear cylinder portion of the V engine. Further, the space disposed between the front cylinder portion and the rear cylinder portion of the V engine is used for disposing the intake system that supplies the front cylinder portion and the rear cylinder portion with air and the main switch fixed to the intake system. In this case, the intake system can be disposed at a position close to the front cylinder portion and the rear cylinder portion.

In addition, even with the main switch fixed to the intake system, flow of air that flows through an inside of the intake system can be maintained.

According to an embodiment of the present invention, the intake system includes an intake path connected to the front cylinder portion and the rear cylinder portion and an air cleaner connected to the intake path, and the main switch is fixed to the intake path.

The intake system is cooled by the air that flows through there inside. Even with the intake system disposed between the front cylinder portion and the rear cylinder portion, the temperature of the main switch fixed to the intake path can be inhibited from rising.

According to an embodiment of the present invention, the air cleaner is disposed on a first side of the intake path and the main switch is disposed on a second side of the intake path.

As an effect, the air cleaner and the main switch are disposed across the intake path in a space between the front cylinder portion and the rear cylinder portion. This allows the space between the front cylinder portion and the rear cylinder portion to be effectively used.

According to an embodiment of the present invention, the saddle-riding type vehicle further includes a cover for covering a side of a space between the front cylinder portion and the rear cylinder portion. The cover further includes an opening made therein. A key cylinder forming part of the main switch is inserted in this opening and a key insertion slot included in the key cylinder faces an outside.

As an effect, in an arrangement in which the main switch is mounted on the intake path using, for example, a stay or the like is covered in the cover.

According to an embodiment of the present invention, the saddle-riding type vehicle further includes a storage space formed inside the cover.

According to an embodiment of the present invention, the cover for covering the side of the space between the front cylinder portion and the rear cylinder portion serves also as a part that forms the storage space. Articles stored in the storage space are then covered in the cover and not exposed to the outside.

According to an embodiment of the present invention, the main switch is disposed between the front cylinder portion and the rear cylinder portion, and the intake system is further disposed between the front cylinder portion and the rear cylinder portion and the main switch is fixed to the intake system. This arrangement allows the main switch to be disposed efficiently in terms of space utilization and the degree of freedom in design on the vehicle body side to be enhanced.

In addition, the intake system is close to the front cylinder portion and the rear cylinder portion, which allows the intake system to be built compactly. Further, the performance of the intake system can be maintained even with the main switch fixed to the intake system.

According to an embodiment of the present invention, the intake system is mainly composed of the intake path connected to the front cylinder portion and to the rear cylinder portion and the air cleaner connected to the intake path and the main switch is fixed to the intake path. Accordingly, even with the main switch disposed between the front cylinder portion and the rear cylinder portion, the main switch is cooled by the intake path, which inhibits the temperature of the main switch from rising.

According to an embodiment of the present invention, the air cleaner is disposed on the first side of the intake path and the main switch is disposed on the second side of the intake path. The air cleaner and the main switch can therefore be disposed across the intake path in the space between the front cylinder portion and the rear cylinder portion. This allows the space between the front cylinder portion and the rear cylinder portion to be effectively used. As a result, the air cleaner and the main switch can be kept protruding less in the vehicle width direction as compared with an arrangement, in which, for example, both the air cleaner and the main switch are disposed on one side of the intake path.

According to an embodiment of the present invention, the cover covers the side of the space between the front cylinder portion and the rear cylinder portion. The cover includes the opening formed therein. The key cylinder that constitutes the main switch is inserted into this opening and the key insertion slot in the key cylinder faces the outside. The foregoing arrangements allow the stay or the like for mounting the main switch on the intake path to be covered in the cover, which enhances appearance.

According to an embodiment of the present invention, there is the storage space provided inside the cover. The storage space can therefore be defined by the cover that covers the side of the space between the front cylinder portion and the rear cylinder portion, which eliminates the need for separately providing a tool box, leading to a reduced number of parts used. In addition, tools and other articles stored are invisible from the outside, which improves appearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
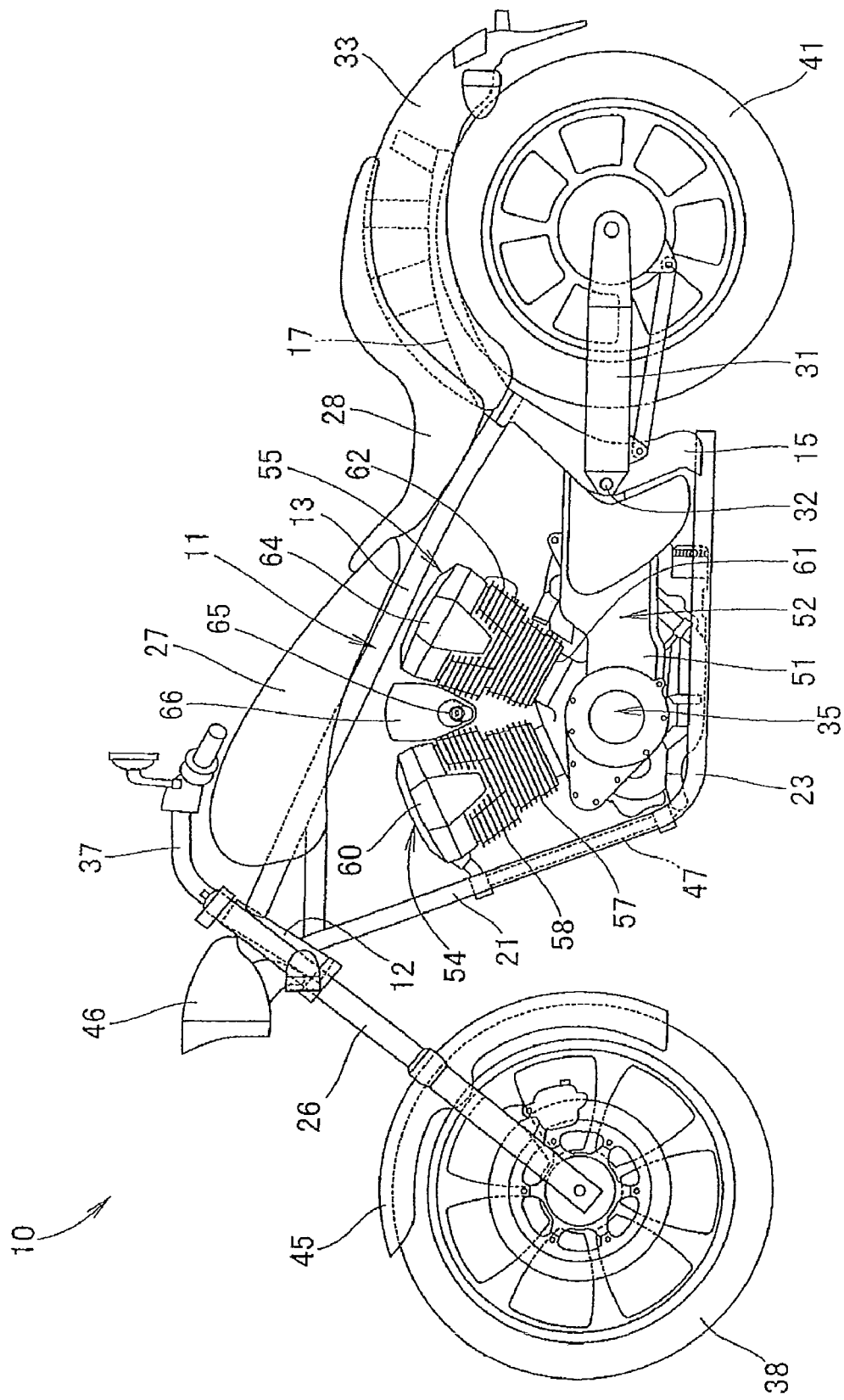
FIG. 1 is a side elevational view showing a saddle-riding type vehicle according to an embodiment of the present invention.

The best mode for carrying out the present invention will be described below with reference to the accompanying drawings. The drawings should be viewed in the direction of reference numerals.

Referring to FIG. 1, a side elevational view illustrates a saddle-riding type vehicle according to an embodiment of the present invention, a saddle-riding type vehicle 10 has a vehicle body frame 11 that includes a head pipe 12, a main frame 13, a pair of left and right pivot frames 15, 16 (only reference numeral 15 representing the pivot frame on a proximal side is shown), a pair of left and right rear frames 17, 18 (only reference numeral 17 representing the rear frame on the proximal side is shown), a pair of left and right down frames 21, 22 (only reference numeral 21 representing the down frame on the proximal side is shown), and a pair of left and right lower frames 23, 24 (only reference numeral 23 representing the lower frame on the proximal side is shown). More specifically, the head pipe 12 is disposed at a front end. The main frame 13 extends obliquely downwardly toward the rear from the head pipe 12. The pivot frames 15, 16 and the rear frames 17, 18 are attached at a rear end portion of the main frame 13. The down frames 21, 22 extend from the head pipe 12 downwardly of the main frame 13 and obliquely downwardly toward the rear. The lower frames 23, 24 extend integrally from lower ends of the down frames 21, 22 toward the rear and are connected to lower ends of the pivot frames 15, 16. The vehicle 10 is an American type motorcycle having the following further arrangements. More specifically, a front fork 26 is steerably mounted on the head pipe 12. A fuel tank 27 and a seat 28 are mounted on an upper portion of the main frame 13. A swing arm 31 is swingably mounted on the pivot frames 15, 16 via a pivot shaft 32. A rear fender 33 is mounted on the rear frames 17, 18. A V engine 35 is mounted on the down frames 21, 22 and the lower frames 23, 24. A handlebar 37 is mounted on an upper end of the front fork 26 and a front wheel 38 is mounted on a lower end thereof. A rear wheel 41 is mounted at a rear end of the swing arm 31.

Referring to FIG. 1, a front fender 45 covers upwardly the front wheel 38. A headlamp 46 is mounted on the front fork 26. A radiator 47 is mounted on the down frames 21, 22 disposed forwardly of the engine 35, for cooling the engine 35.

The engine 35 is a power unit having a transmission 52 integrally disposed at a rear portion of a crankcase 51. The engine 35 includes a front cylinder portion 54 and a rear cylinder portion 55. More specifically, the front cylinder portion 54 extends obliquely forwardly and upwardly from the crankcase 51 and the rear cylinder portion 55 extends obliquely rearwardly and upwardly from the crankcase 51.

The front cylinder portion 54 includes a front cylinder block 57, a front cylinder head 58, a front head cover (not shown), and a front overhead cover 60. More specifically, the front cylinder block 57 is disposed at a front portion of an upper portion of the crankcase 51. The front cylinder head 58 is mounted at an upper portion of the front cylinder block 57. The front head cover covers upwardly of the front cylinder head 58. The front overhead cover 60 covers a circumference of the front head cover.

The rear cylinder portion 55 includes a rear cylinder block 61, a rear cylinder head 62, a rear head cover (not shown), and a rear overhead cover 64. More specifically, the rear cylinder block 61 is disposed at a rear portion of the upper portion of the crankcase 51. The rear cylinder head 62 is mounted at an upper portion of the rear cylinder block 61. The rear head cover covers upwardly of the rear cylinder head 62. The rear overhead cover 64 covers a circumference of the rear head cover.

An intake manifold (not shown) that supplies air into the front cylinder head 58 and the rear cylinder head 62 is disposed between the front cylinder head 58 and the rear cylinder head 62. A main switch 65 that has at least an ignition switch function is mounted on the intake manifold. In FIG. 1, a switch cover 66 covers a circumference of the main switch 65.

Figure 2:
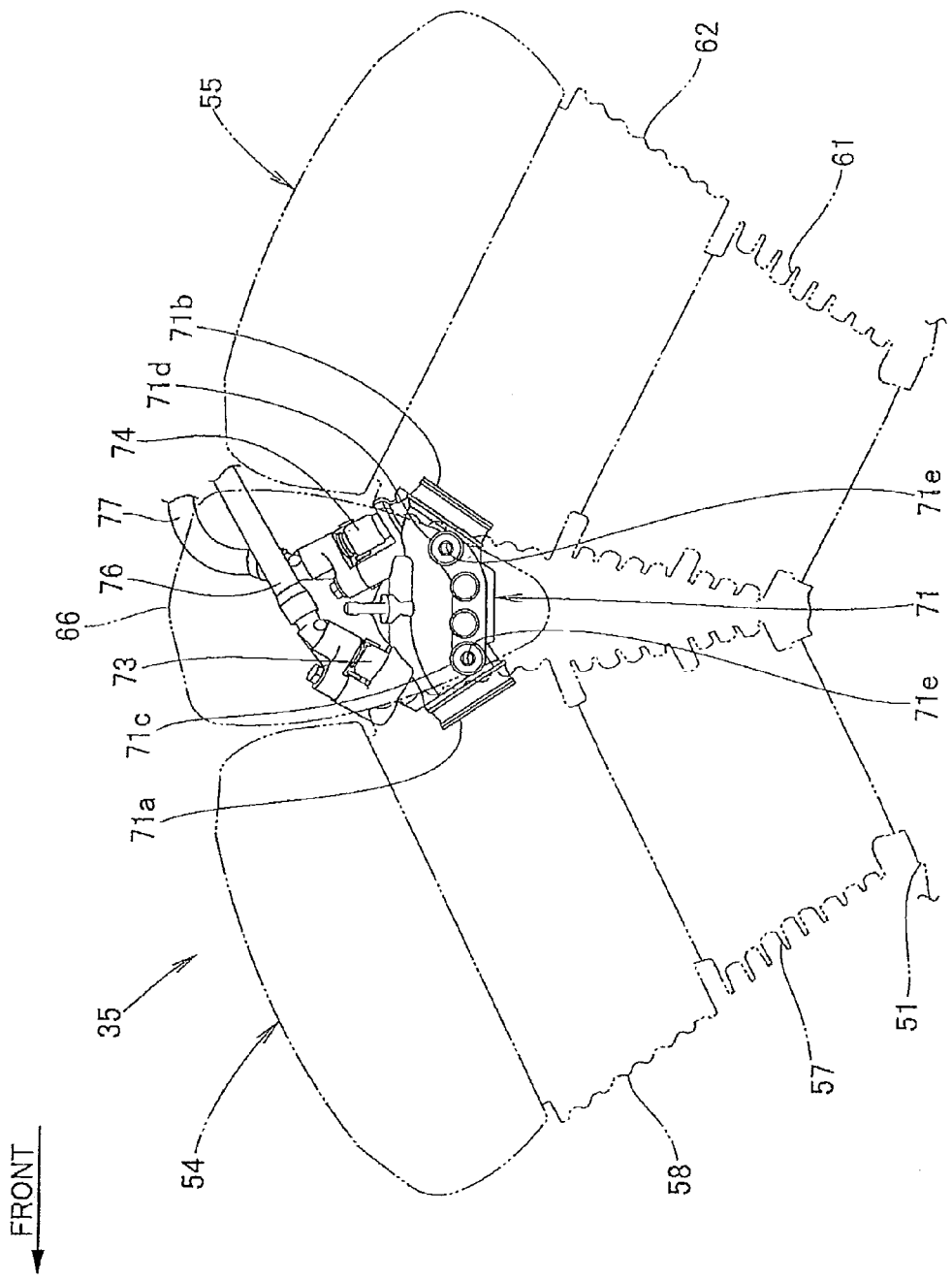
FIG. 2 is a left side elevational view showing a principal part of an engine according to the embodiment of the present invention.

FIG. 2 is a left side elevational view showing a principal part of the engine 35 according to the embodiment of the present invention (an arrow (FRONT) in FIG. 2 indicates a forward direction of the vehicle; the same applies hereunder). An intake manifold 71 is disposed between the front cylinder portion 54 and the rear cylinder portion 55. The intake manifold 71 includes a front delivery port 71a and a rear delivery port 71b. The front delivery port 71a is connected to an intake port of the front cylinder head 58 and the rear delivery port 71b is connected to an intake port of the rear cylinder head 62.

The intake manifold 71 is mounted with a fuel injection valve 73 and a fuel injection valve 74. The fuel injection valve 73 injects fuel to the intake port of the front cylinder head 58 that communicates with the front delivery port 71a. The fuel injection valve 74 injects fuel to the intake port of the rear cylinder head 62 that communicates with the rear delivery port 71b. Further, the intake manifold 71 includes a pair of boss portions 71c, 71d and internal threads 71e, 71e formed therein. More specifically, the boss portions 71c, 71d are formed on a left side surface of the intake manifold 71. The boss portions 71c, 71d are formed for mounting the main switch 65 (see FIG. 1). In FIG. 2, fuel pipes 76, 77 are provided for guiding fuel to the fuel injection valves 73, 74, respectively.

Figure 3:
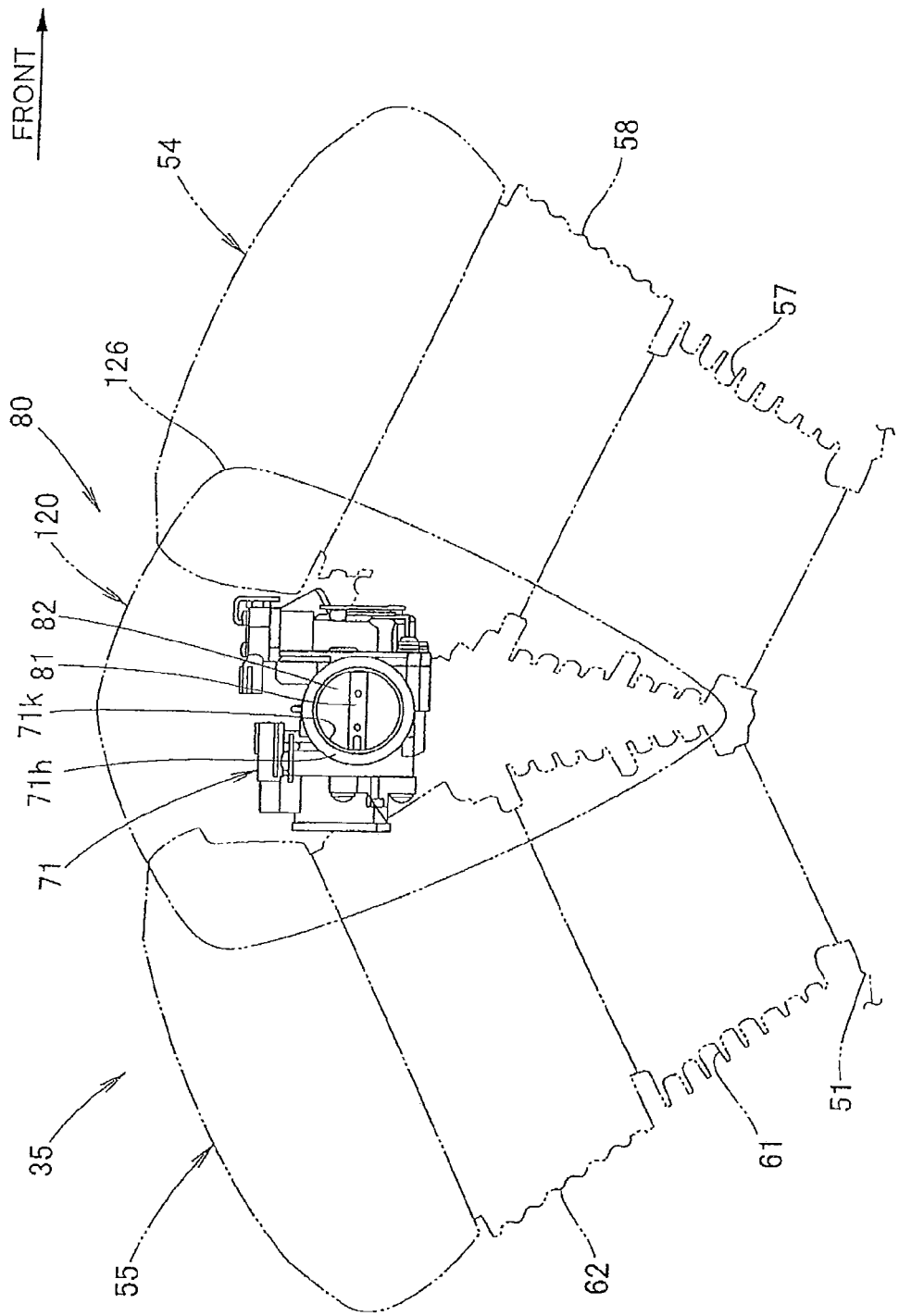
FIG. 3 is a right side elevational view showing a principal part of the engine according to the embodiment of the present invention.

FIG. 3 is a right side elevational view showing a principal part of the engine 35 according to the embodiment of the present invention. The intake manifold 71 includes an intake port 71h formed in a right side surface thereof, to which an air cleaner 120 (to be described in detail later) is connected. The intake manifold 71 and the air cleaner 120 form part of an intake system 80.

In FIG. 3, a main air path 71k extends in a vehicle width direction and is formed in the intake manifold 71 so as to communicate with the front delivery port 71a (see FIG. 2) and the rear delivery port 71b (see FIG. 2). A valve shaft 81 is rotatably mounted in the intake manifold 71 so as to traverse the main air path 71k. A throttle valve 82 is mounted on the valve shaft 81, for opening or closing the main air path 71k.

Figure 4:
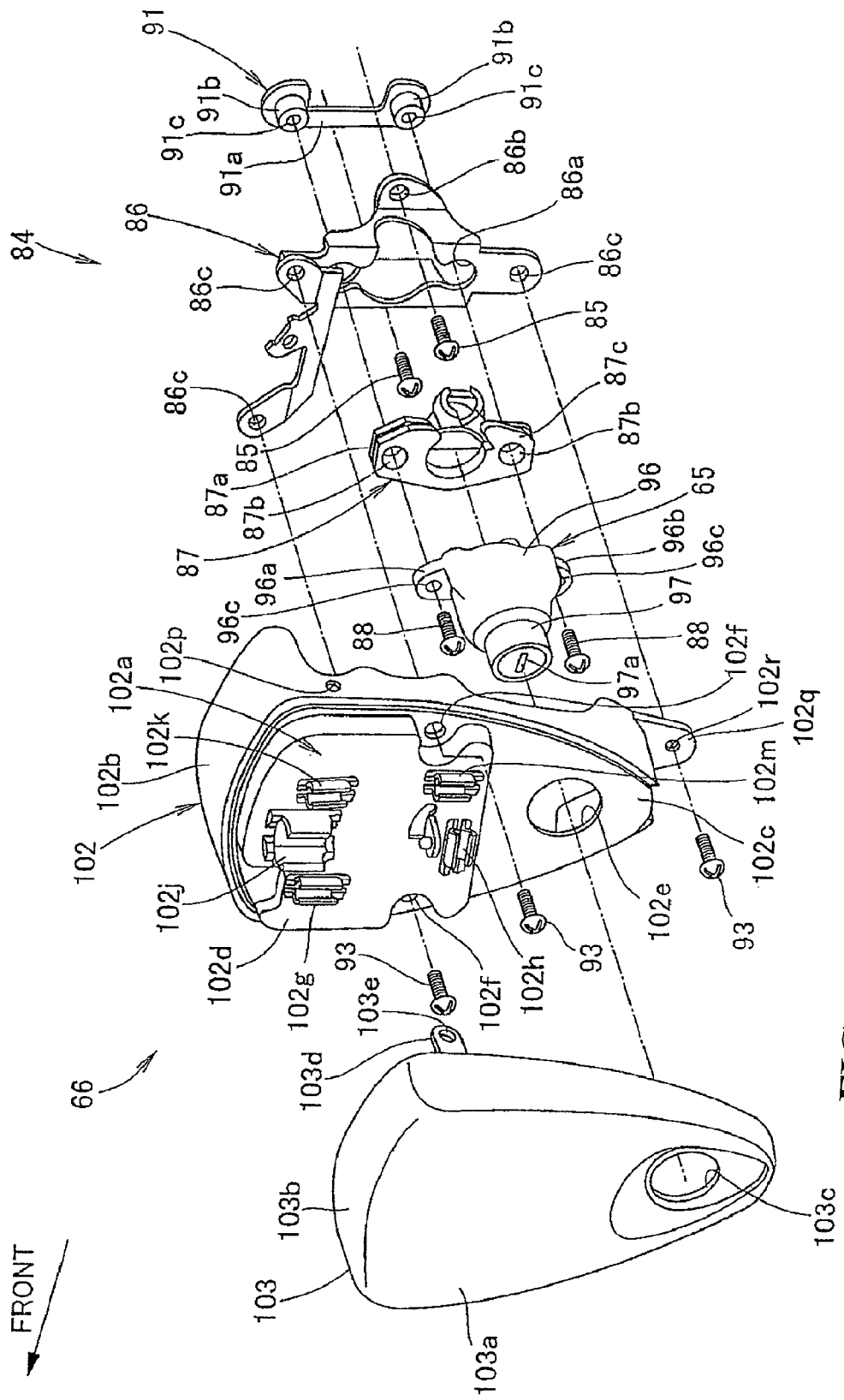
FIG. 4 is an exploded perspective view showing a mounting structure of a main switch according to the embodiment of the present invention.

FIG. 4 is an exploded perspective view showing a mounting structure of the main switch 65 according to the embodiment of the present invention. A mounting assembly 84 for mounting the main switch 65 on the intake manifold 71 (see FIG. 2) includes a switch stay 86, a base member 87, and a fastening member 91. More specifically, the switch stay 86 is attached to the intake manifold 71 using a pair of screws 85, 85. The base member 87 made of rubber is fitted into a hole portion 86a formed in the switch stay 86. The fastening member 91 is disposed at a position at which to sandwich the base member 87 with the main switch 65 and is threadedly connected by screws 88, 88 for attaching the main switch 65.

The switch stay 86 includes screw insertion holes 86b, 86b (only reference numeral 86b representing the insertion hole 86b on one side is shown) and screw insertion holes 86c, 86c, 86c. The screws 85, 85 that are to be screwed into the internal threads 71e, 71e (see FIG. 2) in the intake manifold 71 are passed through the screw insertion holes 86b, 86b. Three screws 93 for attaching an inner cover 102 to be described later are passed through the screw insertion holes 86c, 86c, 86c. The three screws 93 are threadedly connected by nuts not shown mounted on the switch stay 86.

The base member 87 includes an outer peripheral groove 87a and screw insertion holes 87b, 87b. The outer peripheral groove 87a is formed in an outer peripheral portion of the base member 87 into which an edge of the hole portion 86a in the switch stay 86 fits. The screws 88, 88 for attaching the main switch 65 to the switch stay 86 are inserted through the screw insertion holes 87b, 87b.

The fastening member 91 includes a sheet-like base portion 91a, cylindrical protrusions 91b, 91b, and internal threads 91c, 91c formed in the cylindrical protrusions 91b, 91b. More specifically, the protrusions 91b, 91b protrude toward the side of the base portion 91a from an upper portion and a lower portion, respectively, of the base portion 91a. The protrusions 91b, 91b are inserted into the screw insertion holes 87b, 87b in the base member 87 and the screws 88, 88 are screwed into the internal threads 91c, 91c.

The main switch 65 includes a housing 96 and a key cylinder 97 disposed in the housing 96.

The housing 96 includes an upper mounting flange 96a, a lower mounting flange 96b, and screw insertion holes 96c, 96c. The upper mounting flange 96a and the lower mounting flange 96b are disposed at an upper portion and a lower portion, respectively, on an inner side in the vehicle width direction of the housing 96. The upper mounting flange 96a and the lower mounting flange 96b are brought into abutment with a side surface 87c of the base member 87 so as to be attached onto the mounting assembly 84. The screws 88 are screwed into the upper mounting flange 96a and the lower mounting flange 96b.

The key cylinder 97 is disposed with a key insertion slot 97a into which the key is inserted in the vehicle width direction.

The switch cover 66 covers part of the main switch 65 and the mounting assembly 84 from a sideway direction. The switch cover 66 includes the inner cover 102 and an outer cover 103. The outer cover 103 is disposed outside of the inner cover 102 mounted thereto with a screw (not shown).

The inner cover 102 includes a side wall 102a and a peripheral wall 102b that integrally extends inwardly in the vehicle width direction from a peripheral edge of the side wall 102a.

The side wall 102a includes a base portion 102c and a protrusion wall 102d. The base portion 102c is formed into a shape having an outline that is substantially close to an inverted triangle. The protrusion wall 102d is formed to protrude sideways from an upper portion of the base portion 102c. The base portion 102c includes a key cylinder insertion hole 102e and screw insertion holes 102f, 102f, 102r (the screw insertion hole 102r is formed in a lower flange 102q). More specifically, the key cylinder 97 of the main switch 65 is inserted into the key cylinder insertion hole 102e. The screws 93 are inserted into the screw insertion holes 102f, 102f, 102r. The protrusion wall 102d includes tool holding portions 102g, 102h, 102j, 102k, 102m for holding tools. The tool holding portions 102g, 102h, 102j, 102k, 102m are integrally with the protrusion wall 102d.

To attach the outer cover 103 to the inner cover 102, the peripheral wall 102b includes screw insertion holes 102p, 102p (only reference numeral 102p representing the screw insertion hole 102p on one side is shown) drilled in sides at an upper portion of the peripheral wall 102b and a screw insertion hole (not shown) drilled at a lower end thereof.

The outer cover 103 includes a side wall 103a and a peripheral wall 103b that extends toward the inner cover 102 side from a peripheral edge of the side wall 103a. The side wall 103a includes a key cylinder insertion hole 103c drilled in a lower portion thereof. The key cylinder 97 of the main switch 65 is inserted into the key cylinder insertion hole 103c. The peripheral wall 103b includes the protrusions 103d (only reference numeral 103d representing one of the protrusions 103d is shown) formed thereon. The protrusions 103d protrude toward the inner cover 102 side. Each of the protrusions 103d includes a screw insertion hole 103e drilled therein.

Screws 105 (see FIG. 5) are inserted into the screw insertion holes 103e as well as the screw insertion holes 102p in the inner cover 102 when the outer cover 103 is to be mounted to the inner cover 102.

Figure 5:
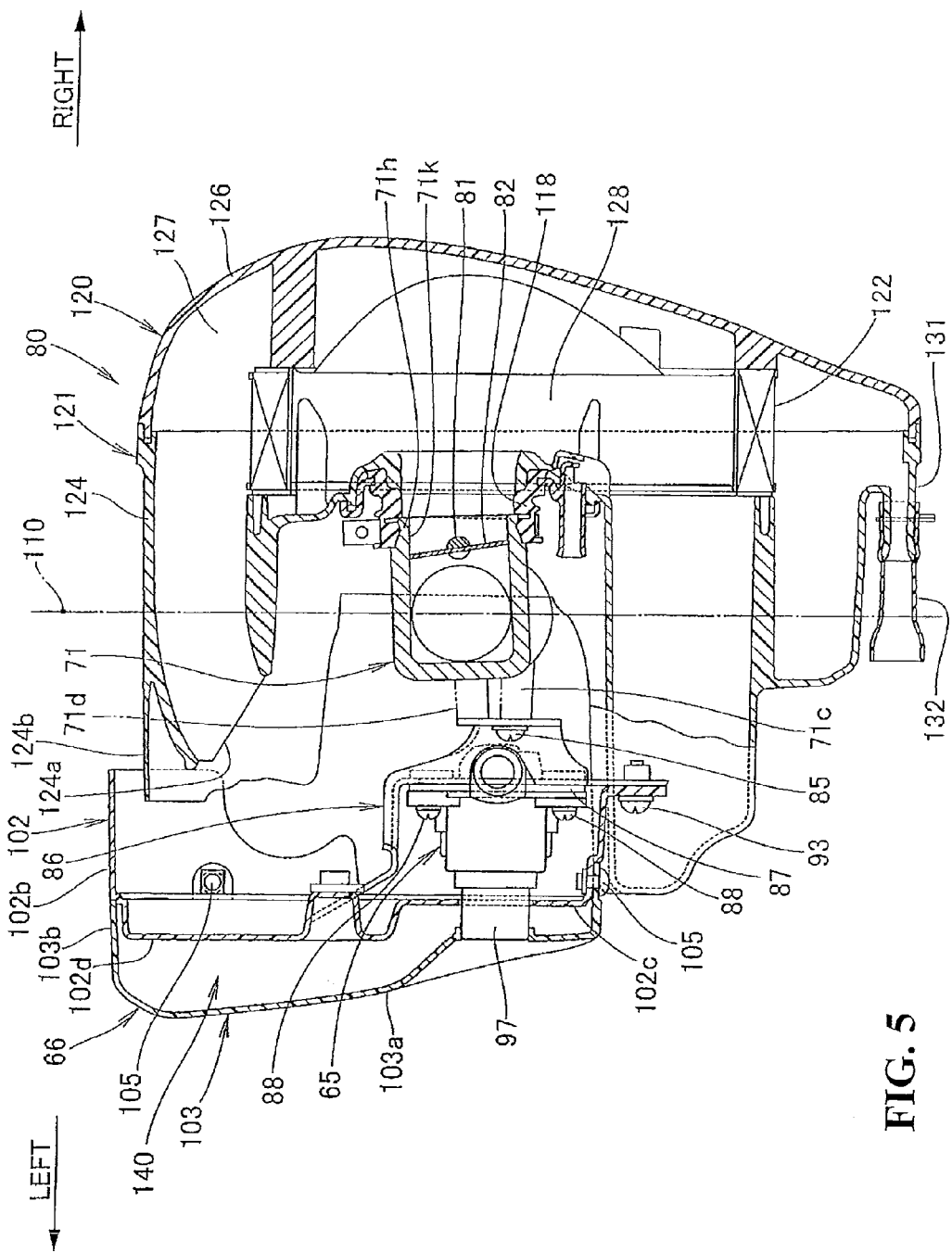
FIG. 5 is a cross-sectional view showing an intake manifold and parts around the same according to the embodiment of the present invention.

FIG. 5 is a cross-sectional view showing the intake manifold 71 and parts around the same according to the embodiment of the present invention (in FIG. 5, an arrow LEFT indicates the leftward direction of the vehicle body and an arrow RIGHT indicates the rightward direction of the vehicle body), taken along a vertical plane that passes through the intake manifold 71 and extends in the vehicle width direction.

In FIG. 5, a vehicle body centerline 110 passes through the center in the saddle-riding type vehicle 10 (see FIG. 1) in its width direction.

The switch stay 86 is attached to the boss portions 71c, 71d disposed on the left side portion of the intake manifold 71 with the screws 85, 85 (only reference numeral 85 representing one of the screws 85, 85 is shown). The main switch 65 is then attached to the switch stay 86 using the base member 87 and the fastening member 91 (see FIG. 4). The switch cover 66 then covers the main switch 65, more specifically, a sideway portion of the main switch 65 excluding an end face (the face having a key insertion slot 97a (see FIG. 4)) of the key cylinder 97.

In addition, the air cleaner 120 is connected to the intake port 71h disposed on the right side portion of the intake manifold 71 via a connecting tube 118 made of rubber.

The air cleaner 120 includes an air cleaner case 121, and an air cleaner element 122 disposed in the air cleaner case 121. The air cleaner case 121 includes a case main body 124 connected to the connecting tube 118 and an air cleaner cover 126 that closes a side opening in the case main body 124. The air cleaner element 122 is fixed in position by being clamped by the case main body 124 and the air cleaner cover 126.

The case main body 124 extends upwardly and downwardly of the intake manifold 71 and includes an intake port 124a, through which outside air is drawn, disposed at an upper portion thereof. The case main body 124 further includes a shield portion 124b that covers at least an area upward of the intake port 124a.

In addition, the peripheral wall 102b of the inner cover 102 of the switch cover 66 covers an area upward of the shield portion 124b, so that dust, dirt, rainwater, and other foreign matter are less easily drawn in through the intake port 124a.

Referring to FIG. 3, the air cleaner cover 126 covers an area between the front cylinder portion 54 and the rear cylinder portion 55 in the right side surface of the engine 35.

Referring to FIGS. 2 and 5, the intake manifold 71 is cooled by an intake air that flows through the inside of the intake manifold 71 even with the main switch 65 disposed between the front cylinder portion 54 and the rear cylinder portion 55. This helps inhibit the temperature of the main switch 65 mounted on the intake manifold 71 from increasing. This eliminates the need for providing a special part, for example, a heat shielding plate, for the main switch 65.

Referring to FIG. 5, a dirty side 127 of the air cleaner 120 is provided adjacent to a clean side 128 of the air cleaner 120. A drain 131 for discharging, for example, water contained in the air cleaner 120 is provided together with a drain tube 132 attached to the drain 131.

Figure 6:
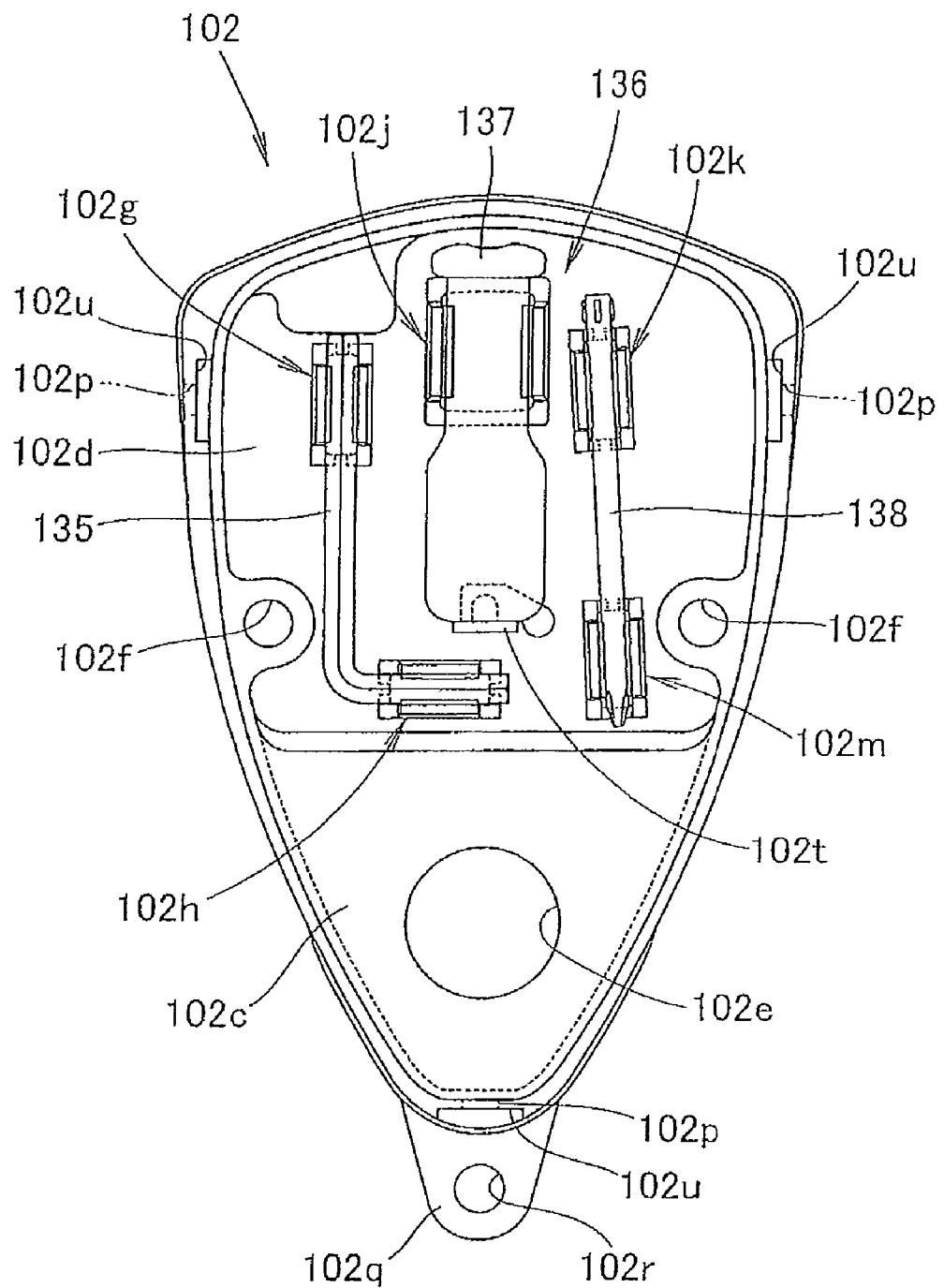
FIG. 6 is a front view showing an inner cover of a side cover according to the embodiment of the present invention.

FIG. 6 is a front view showing the inner cover 102 of the switch cover 66 according to the embodiment of the present invention. The tool holding portions 102g, 102h included in the inner cover 102 hold an L-shaped Allen wrench 135, the tool holding portion 102j of the inner cover 102 holds a handle portion 137 of a screwdriver 136, and the tool holding portions 102k, 102m hold a shank portion 138 removably attached to the handle portion 137 of the screwdriver 136. In addition, in FIG. 6, a handle portion support 102t supports an end portion of the handle portion 137 of the screwdriver 136 and a rectangular slot 102u is provided into which the protrusion 103d (see FIG. 4) is inserted.

Referring to FIGS. 5 and 6, there is a storage space 140 provided inside the switch cover 66, more specifically, between the inner cover 102 and the outer cover 103. The storage space 140 stores therein the tools shown in FIG. 6 (the Allen wrench 135 and the screwdriver 136).

As shown in FIGS. 1 and 2, in the saddle-riding type vehicle 10 mounted with the V engine 35 that has, between the front wheel 38 and the rear wheel 41, the front cylinder portion 54 extending obliquely forwardly and upwardly from the crankcase 51 and the rear cylinder portion 55 extending obliquely rearwardly and upwardly from the crankcase 51, the main switch 65 is disposed between the front cylinder portion 54 and the rear cylinder portion 55. This arrangement allows the main switch 65 to be disposed efficiently in terms of space utilization and the degree of freedom in design on the vehicle body side to be enhanced.

As shown in FIGS. 3 and 5, the intake system 80 is disposed between the front cylinder portion 54 and the rear cylinder portion 55 and the main switch 65 is fixed to the intake system 80. This arrangement allows the main switch 65 to be disposed efficiently in terms of the space utilization and the degree of freedom in design on the vehicle body side to be enhanced. In addition, the intake system 80 is close to the front cylinder portion 54 and the rear cylinder portion 55, which allows the intake system 80 to be built compactly. Further, the performance of the intake system 80 can be maintained even with the main switch 65 fixed to the intake system 80.

In addition, the intake system 80 is mainly composed of the intake manifold 71 as an intake path connected to the front cylinder portion 54 and to the rear cylinder portion 55 and the air cleaner 120 connected to the intake manifold 71 and the main switch 65 is fixed to the intake manifold 71. Accordingly, even with the main switch 65 disposed between the front cylinder portion 54 and the rear cylinder portion 55, the main switch 65 is cooled by the intake manifold 71, which inhibits the temperature of the main switch 65 from rising.

As shown in FIG. 5, the air cleaner 120 is disposed on a first side of the intake manifold 71 and the main switch 65 is disposed on a second side of the intake manifold 71. The air cleaner 120 and the main switch 65 can therefore be disposed across the intake manifold 71 in a space between the front cylinder portion 54 and the rear cylinder portion 55. This allows the space between the front cylinder portion 54 and the rear cylinder portion 55 to be effectively used. As a result, the air cleaner 120 and the main switch 65 can be kept protruding less in the vehicle width direction as compared with an arrangement, in which, for example, both the air cleaner and the main switch are disposed on one side of the intake manifold.

As shown in FIGS. 1, 4, and 5, the switch cover 66 as a cover covers a side of the space between the front cylinder portion 54 and the rear cylinder portion 55. The switch cover 66 includes the key cylinder insertion holes 102e, 103c as openings formed therein. The key cylinder 97 that constitutes the main switch 65 is inserted into the key cylinder insertion holes 102e, 103c and the key insertion slot 97a in the key cylinder 97 faces an outside. The foregoing arrangements allow the stay and other parts (the switch stay 86, the base member 87, and the fastening member 91) for mounting the main switch 65 on the intake manifold 71 to be covered in the switch cover 66, which enhances the appearance.

As shown in FIGS. 5 and 6, there is the storage space 140 provided inside the switch cover 66. The storage space 140 can therefore be defined by the switch cover 66 that covers the side of the space between the front cylinder portion 54 and the rear cylinder portion 55, which eliminates the need for separately providing a tool box, leading to a reduced number of parts used. In addition, the tools (the Allen wrench 135, screwdriver 136) and other articles stored are invisible from the outside, which improves the appearance.

The present invention is suitably adaptable to saddle-riding type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-riding vehicle mounted with a V engine between a front wheel and a rear wheel, the V engine having a front cylinder portion extending obliquely forwardly and upwardly from a crankcase and a rear cylinder portion extending obliquely rearwardly and upwardly from the crankcase comprising:
a main switch disposed between the front cylinder portion and the rear cylinder portion; and
an intake system disposed between the front cylinder portion and the rear cylinder portion,
wherein the main switch is fixed to the intake system.

2. The saddle-riding vehicle according to claim 1, wherein
the intake system includes an intake path connected to the front cylinder portion and the rear cylinder portion and an air cleaner connected to the intake path; and
the main switch is fixed to the intake path.

3. The saddle-riding vehicle according to claim 2, wherein
the air cleaner is disposed on a first side of the intake path and the main switch is disposed on a second side of the intake path.

4. The saddle-riding vehicle according to claim 1, and further comprising:
a cover for covering a side of a space between the front cylinder portion and the rear cylinder portion, the cover including an opening made therein,
wherein a key cylinder forming part of the main switch is inserted in the opening and a key insertion slot included in the key cylinder faces an outside.

5. The saddle-riding vehicle according to claim 2, and further comprising:
a cover for covering a side of a space between the front cylinder portion and the rear cylinder portion, the cover including an opening made therein,
wherein a key cylinder forming part of the main switch is inserted in the opening and a key insertion slot included in the key cylinder faces an outside.

6. The saddle-riding vehicle according to claim 3, and further comprising:
a cover for covering a side of a space between the front cylinder portion and the rear cylinder portion, the cover including an opening made therein,
wherein a key cylinder forming part of the main switch is inserted in the opening and a key insertion slot included in the key cylinder faces an outside.

7. The saddle-riding vehicle according to claim 4, and further including a storage space formed inside the cover.

8. The saddle-riding vehicle according to claim 5, and further including a storage space formed inside the cover.

9. The saddle-riding vehicle according to claim 6, and further including a storage space formed inside the cover.

10. The saddle-riding vehicle according to claim 1, wherein an intake manifold is disposed between the front cylinder portion and the rear cylinder portion, the intake manifold includes a front delivery port and a rear delivery port, the front delivery port is connected to an intake port of the front cylinder portion and the rear delivery port is connected to an intake port of the rear cylinder portion.

11. An ignition switch for a vehicle comprising:
a V engine having a front cylinder portion extending obliquely forwardly and upwardly from a crankcase and a rear cylinder portion extending obliquely rearwardly and upwardly from the crankcase;
a main switch operatively positioned between the front cylinder portion and the rear cylinder portion; and
an intake system operatively positioned between the front cylinder portion and the rear cylinder portion,
wherein the main switch is mounted to the intake system.

12. The ignition switch for a vehicle according to claim 11, wherein
the intake system includes an intake path connected to the front cylinder portion and the rear cylinder portion and an air cleaner connected to the intake path; and
the main switch is fixed to the intake path.

13. The ignition switch for a vehicle according to claim 12, wherein
the air cleaner is disposed on a first side of the intake path and the main switch is disposed on a second side of the intake path.

14. The ignition switch for a vehicle according to claim 11, and further comprising:
a cover for covering a side of a space between the front cylinder portion and the rear cylinder portion, the cover including an opening made therein,
wherein a key cylinder forming part of the main switch is inserted in the opening and a key insertion slot included in the key cylinder faces an outside.

15. The ignition switch for a vehicle according to claim 12, and further comprising:
a cover for covering a side of a space between the front cylinder portion and the rear cylinder portion, the cover including an opening made therein,
wherein a key cylinder forming part of the main switch is inserted in the opening and a key insertion slot included in the key cylinder faces an outside.

16. The ignition switch for a vehicle according to claim 13, and further comprising:
　　a cover for covering a side of a space between the front cylinder portion and the rear cylinder portion, the cover including an opening made therein,
　　wherein a key cylinder forming part of the main switch is inserted in the opening and a key insertion slot included in the key cylinder faces an outside.

17. The ignition switch for a vehicle according to claim 14, and further including a storage space formed inside the cover.

18. The ignition switch for a vehicle according to claim 15, and further including a storage space formed inside the cover.

19. The ignition switch for a vehicle according to claim 16, and further including a storage space formed inside the cover.

20. The ignition switch for a vehicle according to claim 11, wherein an intake manifold is disposed between the front cylinder portion and the rear cylinder portion, the intake manifold includes a front delivery port and a rear delivery port, the front delivery port is connected to an intake port of the front cylinder portion and the rear delivery port is connected to an intake port of the rear cylinder portion.

\* \* \* \* \*